3,083,155
USE OF SPHEROIDIZED STEELS
Lazarus C. Weiner, Great Neck, N.Y., assignor to Esso Research and Engineering Company, a corporation of Delaware
No Drawing. Filed Mar. 21, 1960, Ser. No. 16,186
1 Claim. (Cl. 208—209)

This invention relates to the use of spheroidized steels. It relates particularly to the use of spheroidized steels in apparatus exposed to an atmosphere which consists at least in part of hydrogen gas. It relates more particularly to the use of spheroidized steels in apparatus exposed to such an atmosphere at an elevated temperature and in which the partial pressure of the hydrogen gas is considerably greater than 14.7 p.s.i., or pressure of normal atmospheric air.

A number of industrial processes, particularly processes employed in the petroleum industry, cause exposure of ferrous metal structures to atmospheres consisting at least in part of hydrogen gas. Examples of such processes include catalytic reforming of virgin naphthas and hydrodesulfurization of naphthas and other hydrocarbon materials such as heating oils, lubricating oils, and kerosenes. Particular structural elements subject to hydrogen gas exposure in these atmospheres include furnace and other heat exchanger tubes, piping, reactor vessels, valves, etc.

In catalytic reforming, reactor vessels will contain gases in the temperature range of about 900°–1100° F. having partial pressures of hydrogen in the range of about 150–350 p.s.i. In hydrodesulfurization, reactor vessels will contain gases in the temperature range of about 550°–800° F. having partial pressures of hydrogen in the range of about 100–250 p.s.i. In either process an insulating refractory liner may reduce the temperature at the reactor vessel inner surface by about 100° F., but, importantly for the present invention, hydrogen will diffuse through the liner material and in fact be in contact with the metal structure of the vessel.

A possible deleterious effect of hydrogen gas upon ferrous metals such as are needed to contain gases exerting pressures of the order of magnitude indicated above is that of embrittlement or loss of ductility of a permanent or irreversible nature. This type of embrittlement is known as "hydrogen attack," and is the type with which the present invention is particularly concerned. It is to be distinguished from the temporary or reversible embrittlement of ferrous metals which may be observed in them after exposure at low temperatures and low pressures to hydrogen in aqueous solution. Ductility may be restored in this latter case by baking the embrittled metals at relatively low temperatures up to about 400° F. to drive residual hydrogen out of them.

For a discussion of irreversible embrittlement of ferrous metals due to exposure to hydrogen gas, that is, hydrogen attack, reference may be had to the article, "Blistering and Embrittlement of Pressure Vessel Steels by Hydrogen," by G. A. Nelson and R. T. Effinger appearing at pp. 12f–21f of the Welding Journal, vol. XXXIV, 1955. In general, it may be said that the embrittling effect of hydrogen is increased for any given ferrous material with which it is in contact with increasing gas temperature and partial pressure of hydrogen therein.

To avoid or at least delay the start of irreversible embrittlement of reactor vessels and other pressure-resisting structures which may be exposed to atmospheres containing hydrogen, it has frequently been necessary to specify steels having at least small percentages of alloying elements for the fabrication of these structures. An example of alloy steels so used is one designated A387 by the American Society for Testing Materials. In its grades B and C, this steel contains about 1¼% chromium and ½% molybdenum. In its grade D, it contains about 2¼% chromium and about 1% molybdenum.

Alloy steels are, as a rule, more expensive than plain carbon steels. Accordingly when a structure must be or at least is specified to be fabricated of alloy steel as a protection against hydrogen embrittlement, and assuming that alloy steel is specified for no other reason, the cost of the structure will be increased over what it would be were carbon steel not susceptible to such embrittlement.

According to the present invention it has been found that this susceptibility can be at least substantially reduced, and plain carbon steel made much more suitable for use in atmospheres containing hydrogen through the process of spheroidizing.

For purposes of the present invention, plain carbon steel may be considered as a pure alloy of iron and carbon. It may be graded according to the amount of carbon it contains, the following terms being fairly commonly used.

|  | Carbon content |
|---|---|
| Very low carbon steel, very mild, or extra mild steel, very soft or dead soft steel | Not over 0.10%. |
| Low carbon steel, mild steel, soft steel | Not over 0.25%. |
| Medium soft steel | 0.25 to 0.40%. |
| Medium high carbon steel, half hard steel | 0.40 to 0.60%. |
| High carbon steel, hard steel | Over 0.60%. |
| Very high carbon steel, very hard, or extra hard steel | Over 1.00%. |

It is to be understood, of course, that a steel in commerce may properly be considered a plain carbon steel as it is free of alloying elements such as chromium, molybdenum, etc., although it does contain at least traces of elements such as silicon, phosphorus, sulfur, etc., these latter elements being considered impurities.

Considering plain carbon steels having carbon contents less than about 0.83%, microscopic examination has shown their grain structures usually consist essentially of ferrite and pearlite, adopting the customary terminology of metallography. Ferrite is essentially carbon-free iron occurring in discrete grains. Pearlite comprises lamellae of ferrite and the carbide of iron Fe₃C which is called cementite. To distinguish between the ferrite included in pearlite and the ferrite forming the balance of low carbon steel, the former may be called "pearlite-ferrite" while the latter may be called "structurally free" ferrite or simply "free" ferrite.

With increasing carbon content, more and more of the grain structure of steel appears as pearlite, and at about 0.83% carbon it becomes entirely pearlitic. Steel having a carbon content just sufficient to render its grain structure entirely pearlitic is called "eutectoid" steel. Steel in which there is at least some free ferrite present is called "hypo-eutectoid," while steel containing more carbon than that needed to convert all the free ferrite into pearlite-ferrite, and in which there is accordingly at least some free cementite, is called "hyper-eutectoid."

In the process of making steels having carbon contents of less than about 1.7%, pearlite is formed as a precipitate in the cooling of austenite. This latter material is a solid solution of carbon in gamma iron, the crystal form in which pure iron exists at temperatures above about 1670° F. If steel be of eutectoid composition, that is, about 0.83% carbon, all precipitation of pearlite will take place at a single temperature of about 1333° F. known as the lower critical temperature.

If steel be of hypo-eutectoid composition, precipitation of pearlite will take place over a range of temperatures terminating at about 1333° F. in each case. The maximum range will be about 1670–1333° F. for steel consisting of iron with only a vanishingly small amount of carbon present. If steel be of hyper-eutectoid composition, precipitation of pearlite will also take place over a range of temperatures terminating at about 1333° F. The maximum range will be about 2065–1333° F. for steel which is about 1.7% carbon. The temperature range over which pearlite precipitates from austenite for steel of any particular iron-carbon composition is known as the critical temperature range for that composition.

The condition of cementite in pearlite where it occurs in plate-like form is not entirely structurally stable. If a steel be kept for an extended period of time at a temperature only slightly below the lower critical temperature, for example, if it be kept at a temperature in the range of about 1200–1320° F., the cementite will show a pronounced tendency to collect as a multiplicity of rounded particles embedded in a matrix of ferrite. The same thing will happen also if steel be cycled thermally through a range extending slightly above and below the lower critical temperature. This phenomenon is generally called "spheroidizing." Particularly in relation to cementite in pearlite, the phenomenon is also sometimes called "divorcing" on the basis that a divorce has taken place between the ferrite and cementite constituents of pearlite. Pearlite that has undergone spheriodizing is frequently referred to as "granular" or "globular" cementite.

Embrittlement or loss of ductility in a particular steel may be detected by a decrease in the percent reduction of cross section area of a tensile test specimen of the material in question which is stressed to rupture. Experiments to determine such loss of ductility due to exposure to a hydrogen atmosphere have been conducted on a plain carbon steel corresponding essentially to the designation of an A.S.T.M. A201 steel. This steel had a carbon content of about 0.20% and its microstructure was normally pearlitic; that is, it was non-spheroidized.

Tensile test specimens of the sample material were exposed for about 90 hours to a gaseous atmosphere having a temperature of about 900° F. and a partial pressure of hydrogen of about 700 p.s.i. These specimens were miniatures having the following dimensions:

|  | In. |
|---|---|
| Total length | 2 |
| Gauge length | ½ |
| End diameter at threaded portions | 3/16 |
| Central diameter in gauge length | 0.090 |

A tensile test specimen of the sample material strained to rupture without prior exposure to a hydrogen atmosphere showed a reduction of cross section area of about 70% at the point of breakage. In comparison with this, specimens tested to rupture after hydrogen exposure for the time and conditions of temperature and pressure stated above showed only about 20% reduction of area, or about a 71% decrease in percent reduction of area from the non-exposed specimen when tested to rupture. Such loss of ductility indicated an advanced stage of hydrogen attack, representing as it did an essentially brittle failure.

Additional tensile test specimens of non-spheroidized steel of the kind described were then heated to a temperature of about 1310° F., slightly below the lower critical temperature of 1333° F., and maintained at this temperature for various periods of time to achieve various degrees of spheroidization. Heating was done in an atmosphere of hydrogen having a slight positive pressure, about 10–20 p.s.i. The purpose of the hydrogen was simply that of excluding air to prevent oxidation of the heated steel. The specimens so heated were then exposed to the afore-described gaseous atmosphere having a temperature of about 900° F. and a partial pressure of hydrogen of about 700 p.s.i. After having been exposed to this atmosphere for various periods of time, specimens were taken from it and stressed to rupture. The purpose was to determine the period for which any one of the specimens could be exposed to the high temperature, high pressure atmosphere of hydrogen before any perceptible decrease in its percent reduction of area at rupture was detected.

The period of exposure so determined for any test specimen of the sample material was called its "incubation" time. Tabulating these times against the times that the several specimens had been exposed to an atmosphere having a slight positive pressure of hydrogen and a temperature of 1310° F., and calling these latter times the "spheroidizing" times, experimental results were as follows.

| Spheroidizing time (hours): | Approximate incubation time (hours) |
|---|---|
| 0 | 64 |
| 1 | 70 |
| 3.5 | 89 |
| 7 | 113 |
| 21.5 | 195 |
| 40.3 | 293 |

Since the length of time of heating or preheating at about 1310° F. was itself at least a qualitative measure of the spheroidization effected in the sample steel material, it may be seen that the incubation time was increased by almost a factor of five as a result of the degree of spheroidization obtained by heating the sample plain carbon steel for about 40.3 hours at a temperature only slightly below the lower critical temperature. Significantly, the data given in the foregoing tabulation lie in an essentially straight line when plotted on regular coordinates. This indicates that further benefit in terms of extended incubation time could have been obtained by longer spheroidizing times, that is, by periods of heating at about 1310° F. longer than 40.3 hours.

It is apparent that the plain carbon steel upon which the above-described experiments were carried out was substantially up-graded in respect of its suitability for use as a structural material to be exposed to high temperature atmospheres having high partial pressures of hydrogen gas. The data show that the incipience of hydrogen attack on the at least partially spheroidized steel was retarded, possibly to such an extent that in some cases for practical purposes the likelihood of such attack could be regarded as having been removed altogether. This would be especially possible where the working conditions of the steel caused it to be exposed to gaseous atmospheres cooler than 900° F. and having partial pressures of hydrogen lower than 700 p.s.i. In respect of both temperature and partial pressure, such atmospheres obtain in reactor vessels used in hydrodesulfurization processes. In respect of at least temperature, they obtain also in reactor vessels used in catalytic reforming processes.

Any steel, plain carbon or alloy, may be heated to effect partial or full spheroidization of its included carbides, and thereafter be employed as a structural material in a high temperature, high pressure atmosphere of hydrogen according to the present invention. This invention is concerned principally, however, with the up-grading of plain carbon steels for use in or to contain high temperature atmospheres having high partial pressures of hydrogen gas. Such up-grading will permit significant reductions in cost of construction materials in certain instances.

To those skilled in the relevant art, it will be obvious that numerous variations may be made in the materials and their treatment and end uses particularly described in this specification without departing from the spirit and scope of the present invention. This will be true especially with regard to numerical quantities recited herein. It is intended to cover all these variations in the following claim to the full extent that the prior art permits.

What is claimed is:

In processes employing gaseous atmospheres having a partial pressure of hydrogen of 100–700 p.s.i. and temperatures of about 550 and 1100° F., the use of a vessel comprising a metal shell member of carbon steel having an inner wall portion of steel which has been previously maintained at a temperature of at least about 1200° F. to 1320° F. for a period of at least about 40 hours to spheroidize the inner wall surface thereof whereby a metal is obtained which will retain its ductility over a period of time exceeding 90 hours' exposure to partial pressure of hydrogen gas of 700 p.s.i. and temperature of 900° F. without perceptible decrease in the reduction of area of a test specimen ruptured in tension.

References Cited in the file of this patent

UNITED STATES PATENTS

| 1,077,034 | Bosch | Oct. 28, 1913 |
| 1,188,530 | Bosch | June 27, 1916 |
| 2,634,194 | Nebeck | Apr. 7, 1953 |
| 2,764,515 | Cullen | Sept. 25, 1956 |

OTHER REFERENCES

Reed: "Photomicrographs of Iron and Steel," p. 96, N.Y., John Wiley and Sons, 1923.